Oct. 19, 1926.

G. E. MONROE 1,603,972

NUT LOCK

Filed March 27, 1926

INVENTOR.
George E. Monroe
BY
Gerald F. Baldwin
ATTORNEY.

Patented Oct. 19, 1926.

1,603,972

UNITED STATES PATENT OFFICE.

GEORGE E. MONROE, OF DETROIT, MICHIGAN.

NUT LOCK.

Application filed March 27, 1926. Serial No. 97,856.

It is an object of the invention to provide a nut lock made in one piece and having downwardly flexed resilient ends with upturned projections thereon which normally terminate below the central upper bearing surface through which a hole is provided for the passage of a bolt. These projections are however so positioned that when pressure is exerted on the central bearing surface the angle of incline of the flexed resilient end changes and the projections gradually rise above the bearing surface as pressure on the latter is increased by the tightening of the nut thereon. These projections then constitute stops which engage the nut and hold it against accidental rotation.

Another object of the invention is to provide a nut lock having inbent resilient sides integral with the central bearing surface and which fold thereunder and have substantially semicircular openings at their ends to give clearance for the bolt. These inbent sides not only relieve the end portions of some of the load when the nut is tightened, but also positively prevent the complete flattening of the flexed resilient ends.

With these and other objects in view which will be mentioned as the specification proceeds, the invention is hereinafter more fully described with the aid of the accompanying drawings.

Figure 1:
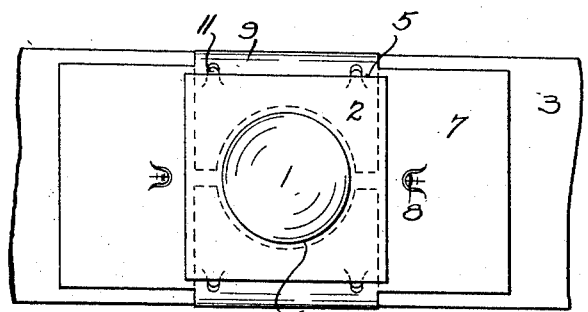
Figure 1 is a plan view of the invention showing it applied between a nut and a plate.
Figure 4:
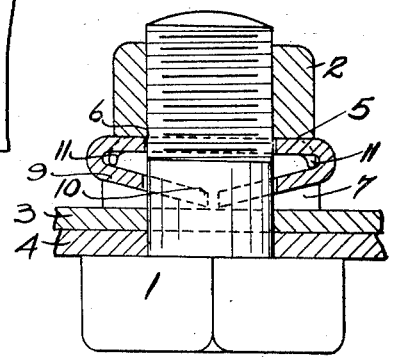
Figure 4 is a section on the line 4—4 of Figure 2.

Referring to the drawings, 1 indicates a bolt and 2 a nut, and 3 and 4 are pieces of plate held together by them.

Figure 3:
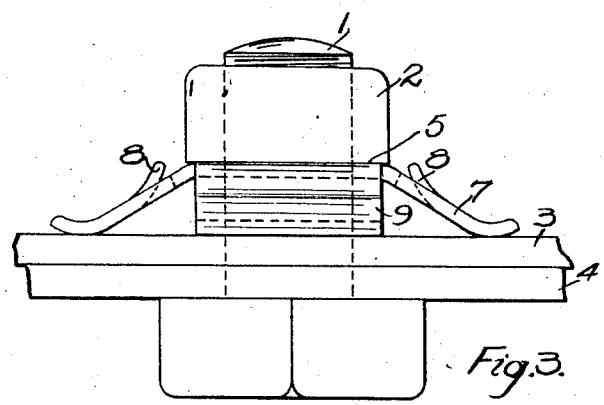
Figure 3 is a side elevation showing the invention with a nut in contact with its upper surface before it has been tightened up.
Figure 5:
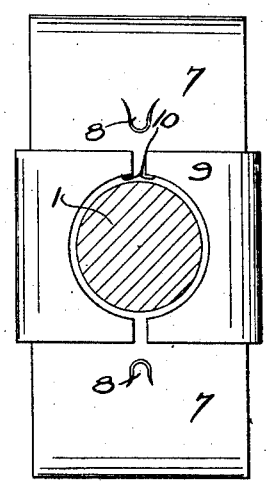
Figure 5 shows an inverted plan of the nut lock.
Figure 2:
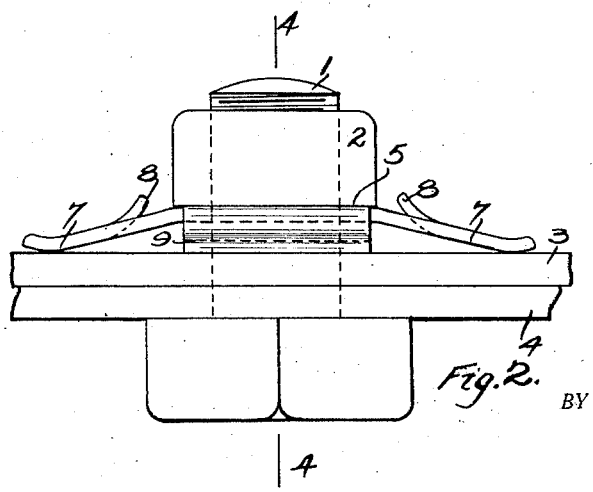
Figure 2 is a side elevation showing the invention under pressure.

The central bearing surface 5 of the nut lock has a hole 6 therethrough for the passage of the bolt 1, and terminates at each end in a downwardly flexed resilient extension 7. Integral with these extensions are upward projections 8. It will be noted that the latter are below the level of the bearing surface 5 when the nut lock is not under pressure as can be seen from Figure 3. However when the nut has been tightened so that pressure is exerted thereby the angle of inclination of the extensions 7 changes and the projections rise above the level of the surface 5 as shown in Figure 2. In this manner the nut is tightened into contact with the surface 5 without having to be forced over the projections as would be the case if the projections were on the bearing surface 5. Again as tightening continues after the nut and bearing surface are in contact the projections rise as the nut descends so that the number of times the nut must be forced over the projections is reduced to a minimum. Again the projections will not check the nut's rotation until the latter has been well tightened against the work, so in this way the possibility of anyone concluding that the nut has been sufficiently tightened because resistance from the projections is met with is to all practical purposes eliminated.

Integral with the bearing surface 5 are inbent resilient side portions 9 provided with substantially semi-circular openings 10 to clear the bolt 1. The material employed in the manufacture of these nut locks is of great strength and resiliency so that these side portions relieve the ends 7 of the breaking strain at the junction of the bearing surface 5 with the inner ends of the extensions. Moreover the resiliency of the portions 9 located immediately under the nut strengthens the unit materially as the leverage on the extensions is such as to make it far easier to bend them than is the case with the portions 9. The arrangement of the latter also positively prevents the complete flattening of the extensions 7.

The projections 8 are generally formed by partly detaching and forcing upwards part of the extensions 7, but if preferred they may consist of separate pieces.

11 indicates downward projections on the bearing surface 5 to prevent the inbent portions 9 coming in contact with the underside of the surface 5. Though in most cases I do not find their use necessary as such considerable pressure is needed to completely flatten these portions against the underside of the bearing surface on account of their position immediately under the nut.

While in the foregoing I have described the preferred embodiment of the invention it is understood that the construction is susceptible to such alterations as fall within the scope of the appended claims.

What I claim is:

1. A nut lock consisting of a single plate having a central portion with a hole therethrough for the passage of a bolt, downwardly inclined resilient extensions integral with said central portion, projections extending upwardly on said extensions terminating normally below the top of said central portion but adapted to rise above the latter when pressure is exerted thereon and the angle of the resilient extensions changed, and inbent sides integral with the central portion doubled back towards one another under the latter to form additional resilient members.

2. In a nut lock, the combination as described in claim 1, wherein the doubled back portions have substantially semi-circular openings in their ends for clearance for the bolt.

3. In a nut lock the combination of a central portion having a hole therethrough for the passage of a bolt, inbent resilient sides integral with said central portion and doubled back thereunder, means for preventing complete flattening of said inbent sides against the underside of said central portion, and downwardly inclined resilient ends having upward projections thereon also integral with said central portion.

GEORGE E. MONROE.